G. L. THORNE.
Portable-Heater.
No. 197,749.   Patented Dec. 4, 1877.
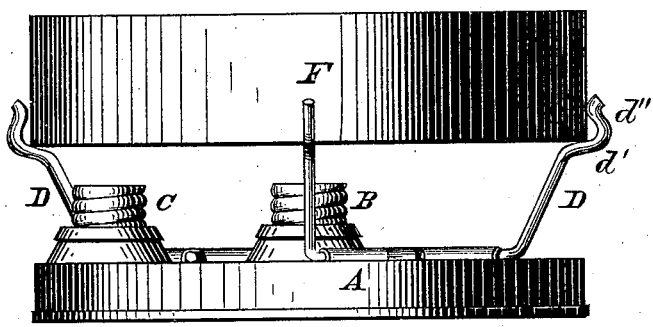
Fig. 1.
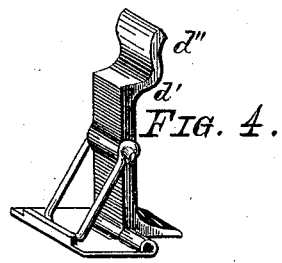
Fig. 4.
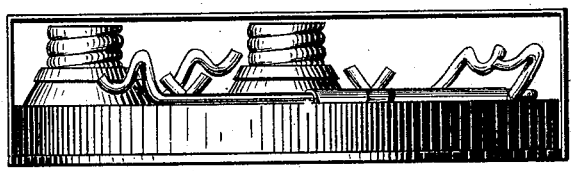
Fig. 3.
Fig. 2.
Fig. 5.
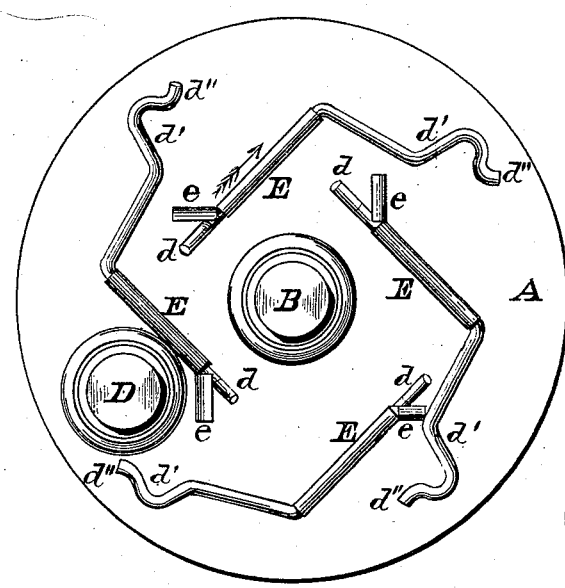
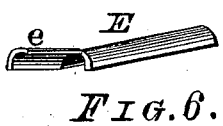
Fig. 6.
Fig. 7.
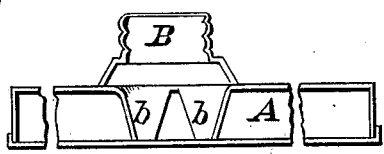
Fig. 8.
Witnesses:
Frank Hirsch
Chas. Bessart
Inventor:
Geo. L. Thorne
by Michael J. Stark
atty.
N. PETERS, PHOTO-LITHOGRAPHER, WASHINGTON, D. C.

UNITED STATES PATENT OFFICE.

GEORGE L. THORNE, OF BUFFALO, NEW YORK, ASSIGNOR OF ONE-HALF HIS RIGHT TO GEORGE L. FARNSWORTH, OF SAME PLACE.

IMPROVEMENT IN PORTABLE HEATERS.

Specification forming part of Letters Patent No. 197,749, dated December 4, 1877; application filed October 27, 1877.

*To all whom it may concern:*

Be it known that I, GEORGE L. THORNE, of Buffalo, in the county of Erie and State of New York, have invented certain new and useful Improvements on a Portable Heater; and I do hereby declare that the following description of my said invention, taken in connection with the accompanying sheet of drawings, forms a full, clear, and exact specification, which will enable others skilled in the art to which it appertains to make and use the same.

My invention relates in general to portable heaters for lunches, &c., and its novelty will be first fully described, and then pointed out in the claims.

In the drawings heretofore mentioned, Figure 1 is an elevation of my improved heater. Fig. 2 is a plan of the reservoir and attachments. Fig. 3 is a partial transverse section through the heater when packed for transportation. Fig. 4 is a perspective elevation of a modified form of my pivoted locking-supports. Fig. 5 is a transverse section through cap G. Fig. 6 is a perspective view of the tube E. Fig. 7 is a plan of a fragment of the tube E and support D, and Fig. 8 is a fragmental sectional view of the reservoir A.

Like letters of reference indicate corresponding or similar parts in all the various figures.

The object of my invention is the production of a portable heater for use of hunters, fishermen, and other sportsmen, to enable them and others to prepare warm meals while camping out, said heater to be so constructed as to be also readily applied to the common dinner-pail for warming coffee, &c.

To this end I construct my heater of a reservoir, A, to contain liquid fuel, such as alcohol and other spirits, or hydrocarbon oils, &c., it being made of a capacity to hold sufficient liquid to supply heat for a considerable length of time. This fuel is consumed by a burner, B, consisting of an externally screw-threaded tube, having a flaring flange, by means of which it is soldered to the top disk of said reservoir A, said tube being supplied with the necessary wicking to draw the fuel from the reservoir by capillary attraction.

The reservoir A is filled by means of a screw-tube, C, placed near the edge of the before-mentioned top disk, and constructed in precisely the same manner as the wick-tube B.

Upon the reservoir are fitted four (more or less) hinged supports, D, as shown in the several figures, which supports are retained in position by tubes E, soldered to the top disk. These supports have their ends bent at $d$ to form a hook, which engages with the open end $e$ of said tube E, and thereby retains the supports D in a perpendicular position. The other end of these supports has the shoulder $d'$, upon which the vessel F, containing the food to be prepared, is carried, and it has the bend $d''$, arranged to grasp the vessel F or an ordinary dinner-pail above its bottom seam, so that the entire apparatus can be suspended from such pail and carried about with it.

The supports D are preferably made of wire, having sufficient elasticity to enable them to deflect somewhat when the dinner-pail is passed over the bends $d''$, after which said supports will tightly grasp the pail by tending to regain their normal position.

The vessel F consists of a plain dish, having a rim of sufficient height to cover the reservoir A and its accessories, (the supports D being folded up, as hereinafter to be referred to,) as illustrated in Fig. 3, and in this position it serves as a casing for the heating apparatus, it being of such a diameter as to fit the reservoir snugly, and its rim being slightly tapering to withdraw readily from said reservoir A.

It will be observed that the supports D are hinged to the reservoir A, and in Figs. 2 and 3 I have shown them in a horizontal position, or folded down. To bring and lock them in a vertical position, they are first turned upward, and then drawn radially outward, as indicated by an arrow in Fig. 2, when the hooks $d$ of said supports pass under the bent and open end $e$ of the tubes E, and thus prevent the said supports from turning within the tubes, and thereby changing their position.

It is obvious that various other hinged locking-supports may be employed, and I have illustrated a modified form of such in Fig. 4, which support is capable of being turned down and self-locking in a perpendicular position.

In heaters and cooking apparatus, substantially as hereinbefore described, it is often desirable to continue the flame in the burner for some time without producing sufficient heat to boil the contents of the vessel F. In this case I use the cap G. (Shown in Fig. 5.) This cap has a central aperture, $g$, of suitable size, which, when placed over the wick-tube B, will reduce the size of the flame to that of the aperture in said cap G, and thus accomplish the desired object in a quick and efficient manner, so that I can keep the contents of the vessel F at any desired temperature for any length of time. When not in use for the purpose indicated, this cap G may be placed onto the cap C, which may be made sufficiently smaller than said cap G for this purpose.

When my improved heater is applied to a dinner-pail, I use the dish F either as a partition therein, to separate different kinds of food, or I construct the pail of such size that said dish F forms a cover for it. Its main purpose, however, in any of these cases, is to enable the person using this apparatus to boil, cook, fry, or stew his meal in this pan, and it should for this reason be preferably made of one solid piece of metal, so as to avoid soldered joints. When the apparatus is entirely closed up, as shown in Fig. 3, there is sufficient room left for placing a small sized fork, knife, or spoon between the reservoir and the cap F, which will complete the device as a portable heater, &c., for outdoor and indoor use, and render the same highly serviceable.

To prevent the top and bottom disks, forming part of the reservoir A, from deflecting or being pressed together, which would reduce the interior space and cause liquid to be forced out of the same, I construct a bridge-piece, $b$, to connect both disks. This bridge-piece $b$ may be made in any desirable manner; but I prefer to produce it by punching the metal downward, as shown in Fig. 8, whereby I have only one joint to solder instead of two, if the bridge is made of a separate piece. This bridge, being in fact a slit tube, serves also as a guard for the wicking, and prevents the same from being pushed into the reservoir.

Having thus fully described my invention, I claim as new and desire to secure to me by Letters Patent of the United States—

1. The combination, with the heater A, of the pivoted supports D, as and for the purpose specified.

2. The combination, with the vessel A, of the pivoted supports D, provided with means for locking, as specified.

3. The combination, with the heater A, having the pivoted supports D, of the vessel F, as specified, said vessel F being arranged to form a cover for the heater A, as stated.

4. The combination, with the vessel A, of the pivoted locking-supports D, having the hooks $d$, and tubes E, having the open bent ends $e$, as and for the purpose stated.

In testimony that I claim the foregoing as my invention I have hereto set my hand and affixed my seal in the presence of two subscribing witnesses.

GEO. L. THORNE. [L. S.]

Attest:
MICHAEL J. STARK,
FRANK HIRSCH.